United States Patent [19]

Ando

[11] Patent Number: 5,105,427

[45] Date of Patent: Apr. 14, 1992

[54] DATA STORAGE APPARATUS

[75] Inventor: Kengo Ando, Sagamihara, Japan

[73] Assignee: Hitachi, Ltd., Tokyo, Japan

[21] Appl. No.: 309,882

[22] Filed: Feb. 14, 1989

[30] Foreign Application Priority Data

Mar. 11, 1988 [JP] Japan .................................. 63-56062

[51] Int. Cl.$^5$ ........................ G06F 11/10; G11C 29/00
[52] U.S. Cl. .................................. 371/40.1; 371/10.2; 395/575
[58] Field of Search ................ 371/5.1, 10.1, 10.2, 371/40.1, 51.1; 364/200, 245.3, 268.5

[56]         References Cited
U.S. PATENT DOCUMENTS

| | | | |
|---|---|---|---|
| 4,562,577 | 12/1985 | Glover et al. ........................ | 371/40.1 |
| 4,809,265 | 2/1989 | Hart et al. ............................ | 371/48 |
| 4,839,745 | 6/1989 | Tindall ................................ | 371/10.2 |
| 4,907,226 | 3/1990 | Endo .................................... | 371/10.1 |

Primary Examiner—Charles E. Atkinson
Attorney, Agent, or Firm—Antonelli, Terry, Stout & Kraus; Antonelli, Terry, Stout & Kraus

[57]  ABSTRACT

A data storage apparatus used in a form incorporated into a computer system or the like comprises a storage medium including a multiplicity of usual data regions each of which has a predetermined capacity and in or from which usual data are to be written or read and management data regions which are provided corresponding to the usual data regions or a plurality groups of usual data regions respectively and in which management data from the corresponding usual data regions are to be stored. When the writing or reading of usual data in or from a certain usual data region has resulted in a failure, management data stored in a management data region corresponding to that usual data region are rewritten.

13 Claims, 8 Drawing Sheets

FIG. 2

| TRACK NUMBER | | | | | | | | |
|---|---|---|---|---|---|---|---|---|
| 0 | 0 | 1 | 2 | 3 | 4 | 5 | 6 | 7 |
| 1 | 8 | 9 | 10 | 11 | 12 | 13 | 14 | 15 |
| 2 | 16 | 17 | 18 | 19 | 20 | 21 | 22 | 23 |
| ⋮ | | | | ⋮ | | | | |
| 153 | 1224 | 1225 | 1226 | 1227 | 1228 | 1229 | 1230 | 1231 |
| 154 | 0' | 1' | 2' | | | | | |

NUMERAL IN □ REPRESENTS CONSECUTIVE SECTOR NUMBER

| 0 | 2 | 4 | 6 |
|---|---|---|---|
| 0 | 1 | 2 | 3 |

1 SECTOR = 1024 BYTES

| 512 | 513 | 514 | 515 |

| 1024 | 1025 | 1026 | 1027 |
| 1028 | 1029 | 1030 | 1031 |

FIG. 3

| TRACK NUMBER | SECTOR NUMBER IN TRACK | | | | | | | |
|---|---|---|---|---|---|---|---|---|
| | 1 | 2 | 3 | 4 | 5 | 6 | 7 | 8 |
| 0 | | | | | | | | |
| 1 | | | | | | | | |
| 2 | | | | | | | | |
| 3 | | | | | | | | |
| 4 | | | | | | | | |
| ..... | | | | | | | | |
| 19 | | | | | | | | |

DATA STORAGE APPARATUS

BACKGROUND OF THE INVENTION

The present invention relates to a data storage apparatus used in a form incorporated into a computer or the like, and more particularly to a data storage apparatus suitable for maintenance of programs or data stored therein.

In a computer system or the like, there is no knowing when programs or data (hereinafter simply referred to as data in a general term) stored in a storage or recording medium become unreadable. Conventionally, therefore, the maintenance of data has necessitated periodical or occasional backup by another storage medium.

A technique of indicating or displaying an abnormal condition of hardware is known by, for example, JP-A-62-6346, and a technique of warning the life time of a system resource is known by, for example, JP-A-58-109948.

In the above-mentioned prior art, no consideration has been paid to the amount of labor for maintenance work by a user of a computer or the like and hence there is a problem that a backup requires a long time.

SUMMARY OF THE INVENTION

Therefore, an object of the present invention is to provide a data storage apparatus in which a condition of a storage medium is monitored to make it possible to recognize an appropriate opportunity for exchange of the storage medium or an appropriate opportunity for required backup work, thereby permitting a safe management or maintenance of data.

According to the present invention, the above object can be achieved in such a manner that a usual data area for storage of usual data, and a management data area for storage of management data corresponding to any failure of the writing or reading of usual data in or from the usual data area are provided on a storage medium, and the management data in the management data area are rewritten upon failure of writing or reading of usual data in or from the usual data area.

Storage area setting means sets on the same storage medium the usual data area for recording of usual data divided into a plurality of usual data regions each of which has a predetermined capacity, and the management data area for record of management data includes a plurality of management data regions which correspond to the usual data regions or a plurality of groups of usual data regions respectively and in which management data for the corresponding usual data regions are to be recorded. Usual data storage controlling means manages the writing or reading of usual data in or from the usual data regions of the usual data area as the succession or linkage of the usual data regions. Error region detecting means compares the number of usual data regions in or from which usual data are to be written or read by the usual data storage controlling means with the number of usual data regions in or from which the usual data have been successfully written or read. When both the numbers do not coincide with each other, the error region detecting means detects or specifies a usual data region subsequent to the last usual data region successful a data write or a data read as being a defective region. Management data storage controlling means reads management data from a management data region corresponding to the defective usual data region specified by the error region detecting means to perform the processing of operation on the read management data and writes the result of operation into the management data region again.

Management data displaying means may be provided for reading the management data recorded in the management data area and displaying the read management data. An opportunity for exchange of the storage medium or the presence/absence of a need for backup work can be properly udged on the basis of the displayed management data or values.

BRIEF DESCRIPTION OF THE DRAWINGS

FIG. 2 is a view for illustrating the allocation of various data regions in the embodiment;

FIG. 3 is a view showing an example of a method of displaying management data in the embodiment;

DESCRIPTION OF THE PREFERRED EMBODIMENTS

An embodiment of the present invention will now be explained in reference with the accompanying drawings.

Figure 9:
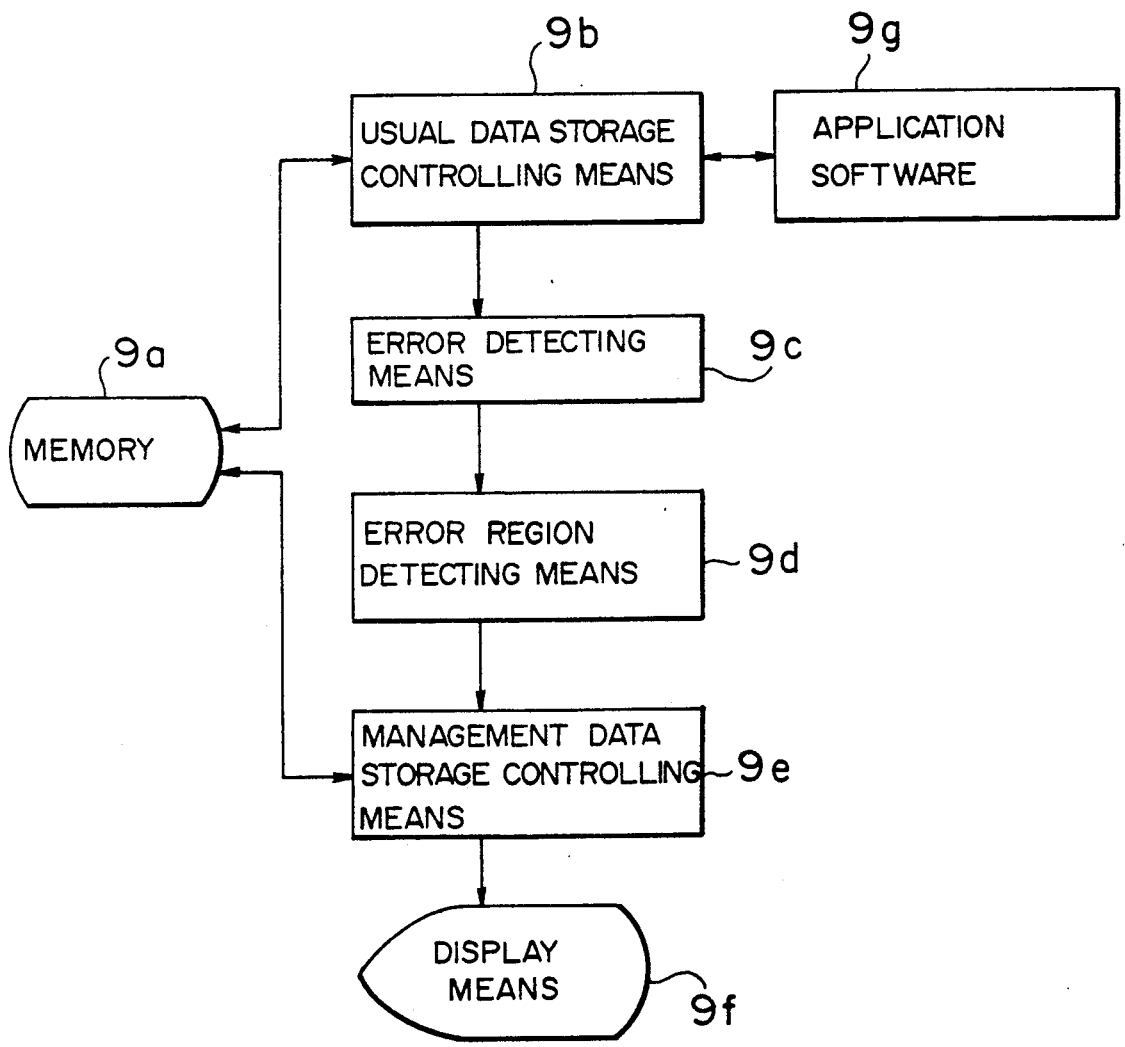
FIG. 9 is a block diagram showing the whole construction of the embodiment.

FIG. 9 is a view showing the whole construction of an embodiment of the present invention. In FIG. 9, reference numeral 9a designates a memory having a usual data area and a management data area. This usual data area is divided into a plurality of usual data regions, each of which has a predetermined capacity, and in or from each of which usual data is written or read. The management data area included a plurality of management data regions which corresponds to the usual data regions respectively and in which management data for the respective usual data regions are stored. Numeral 9b designates a usual data storage controllnig means for controlling the writing of usual data from an application program 9g into the usual data area (or thememory 9a) or the reading of usual data from the memory 9a for the application program 9g for every usual data region. Numeral 9c designates an error detecting means for detecting the presence/absence of any failure into writing or reading or usual data in or from the memory 9a by the usual data sotrage controlling means 9b. Numeral 9d designates an error region detecting means for responding to the detection of data write or data read failure by the error detecting means 9c to detect or specify a usual data region of the memory 9a subjected to the data write or data read failure. Numeral 9e designates a management data storage controlling means for rewriting management data stored in a management data region corresponding tot he usual data region specified by the error region detecting means 9d. Numeral 9f designates a displaying means for reading the stored contents of the management area of the memory 9a and displaying the stored contents on a display screen as the stored contents are presently stored or in any desired display form. The displaying means 9f may display a warning message or the like to an operator in accordance with the stored contents of the management data area.

Figure 8:
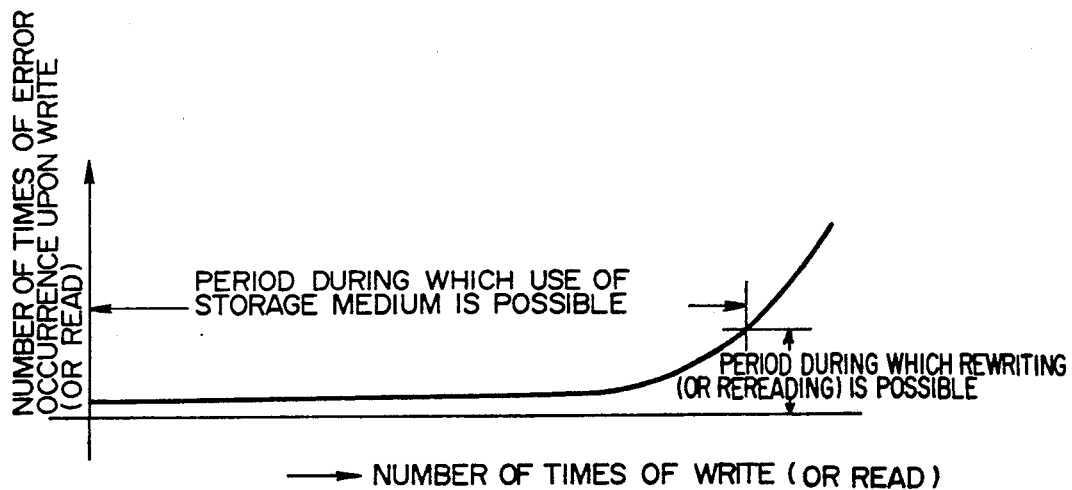
FIG. 8 is a view for explaining a relationship between the number of times of writing (or reading) of usual data in (or from) a storage medium and the number of times of occurrence of error upon data write (or data read)

Next, more detailed explanation of the embodiment will be made by virtue of FIGS. 1 to 8. FIG. 8 shows a relationship between the number of times that data is written into (or data read from) a storage medium, for example, a floppy disk and the number of times of occurrence of error upon the data write (or the data read). The number of times of error occurrence increases with the increased number of times of the data write (or the data read). The successful recovery from an error of the data write (or the data read) corresponds in some degree to the repetition of rewriting (or rereading), but the continuation of such a situation ultimately results in the impossibility to write data (or to read data). Therefore, in the present embodiment, the status of occurrence of error is monitored, making it possible to exchange the floppy disk or to backup the data before the data write (or the data read) becomes impossible to perform.

Figure 1:
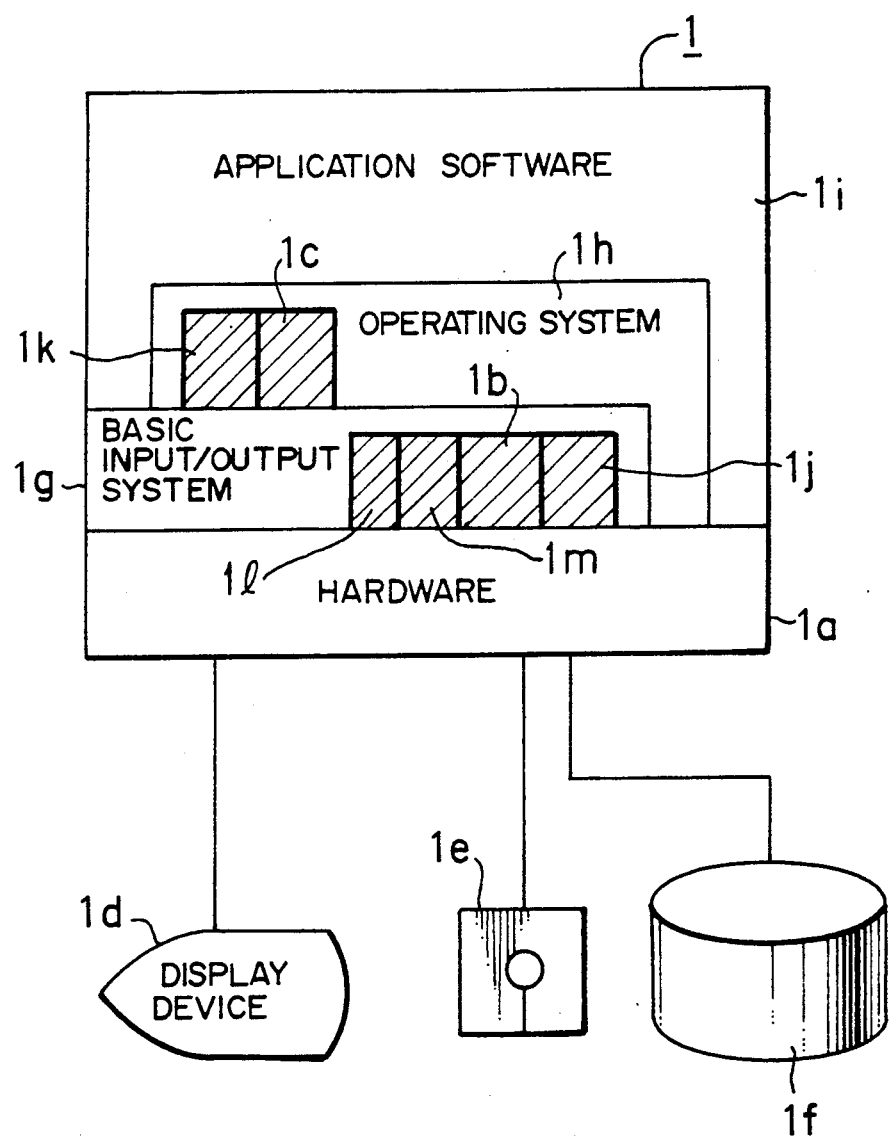
FIG. 1 shows a block diagram for illustrating an embodiment of the present invention.

FIG. 1 is a block diagram schematically showing a computer system 1. The computer system 1 is composed of a hardware 1a including various processing circuits or interface circuits, a display device 1d connected to the hardware 1a, a floppy disk device 1e connected to the hardware 1a, a hard disk device 1f connected to the hardware 1a, an operating system 1h for performing basic control of the computer system 1, a basic input-/output system 1g interposed mainly between the operating system 1h and the hardware 1a for performing an input/output operation at a low level, an application software 1i prepared in accordance with an object to be processed by the computer system 1, and so on. Such a computer system 1 is known. Therefore, further detailed explanation of the constituent elements will be omitted.

Reference numeral 1c designates a storage area setting means preliminarily prepared in the operating system 1h for initializing a floppy disk included into the floppy disk device 1e. The storage area setting means 1c sets on the floppy disk a usual data area for storage of usual data divided into a plurality of usual data regions, each of which has a predetermined capacity, and a management data area including a plurality of management data regions which are provided corresponding to the usual data regions respectively and in which management data for the corresponding usual data regions are to be stored. Referring to FIG. 2 showing a concrete example, the floppy disk is divided into 78 (seventy eight) concentric rings (or cylinders); opposite sides of those concentric rings are controlled by virtue of track numbers of 0 to 154, alternately allotted thereto, and one track is divided into 8 (eight) regions (hereinafter referred to as sectors), each of which has 1024 bytes. A heading or leading portion of the sector 2c includes successively arranged IPL (Initial Program Loader), FAT (File Allocation Table), directory region, etc. and is followed by a file of program data or a file of data. As is conventionally known, the files are managed as the succession (or linkage) of the sectors 2c recorded in the FAT's. For convenience of the following explanation, in the present embodiment, the sectors 2c are simply defined as a usual data area 2a for the recording of usual data managed as the linkage of the sectors 2c. Reference numeral 2b designates a management data area for record of management data provided in the final or 154th track. Three sectors indicated by sector numbers of 0', 1' and 2' in the final or 154th track are allotted as the management data area. The management data area 2b, includes management tables 2d each of which is divided into management table regions 2e, each having 2 bytes. Link or consecutive numbers marked on the management table regions 2e prepared in the management tables 2d correspond to those marked on the usual data regions 2c in the usual data area 2a, respectively. In each management table region 2e of the management data area 2b is recorded the accumulative number of times of data write or data read failure in the corresponding sector 2c of the usual data area 2a.

Numeral 1l designates a usual storage controlling means previously provided in the basic input/output system 1g, and numeral 1m designates error detecting means. The usual storage controlling means 1l manages, as to individual, usual data region, the writing of usual data from an application software 1i into the usual data area or reading the usual data from the memory means 1e, 1f to the application software 1i. The error detecting means 1m detects the presence or absence of the failure of the writing or reading of usual data due to the usual data storage controlling means 1l to the memory means 1e, 1f.

Reference numeral 1b in FIG. 1 designates an error region detecting means preliminarily prepared in the basic input/output system 1g. The error region detecting means 1b compares the number of sectors in the usual data area 2a to be subjected to a data write or data read operation designated by the operating system 1h and managed in the basic input/output system 1g with the number of sectors in or from which usual data have been successfully written or read through the hardware 1a. When one of the numbers does not coincide with another of the numbers, the error region detecting means 1b detects or specifies a sector subsequent to the last sector which was data write or data read successfully as being a defective sector. Reference numeral 1j designates a management data storage controlling means preliminarily prepared in the basic input/output system 1g. The management data storage controlling means 1j reads management data corresponding to the defective sector specified by the error region detecting means 1b from the management data table 2d through the hardware 1a, and performs addition corresponding to the read data (or the number of times of error). The result of addition (or the accumulative number of times of error) is written into the corresponding management data table 2d.

Next, a series of operations concerning the reading of files from the floppy disk in the floppy disk device 1e by the error region detecting means management data storage controlling means 1j will be explained by virtue of flow charts shown in FIGS. 4, 5 and 7.

Figure 4:
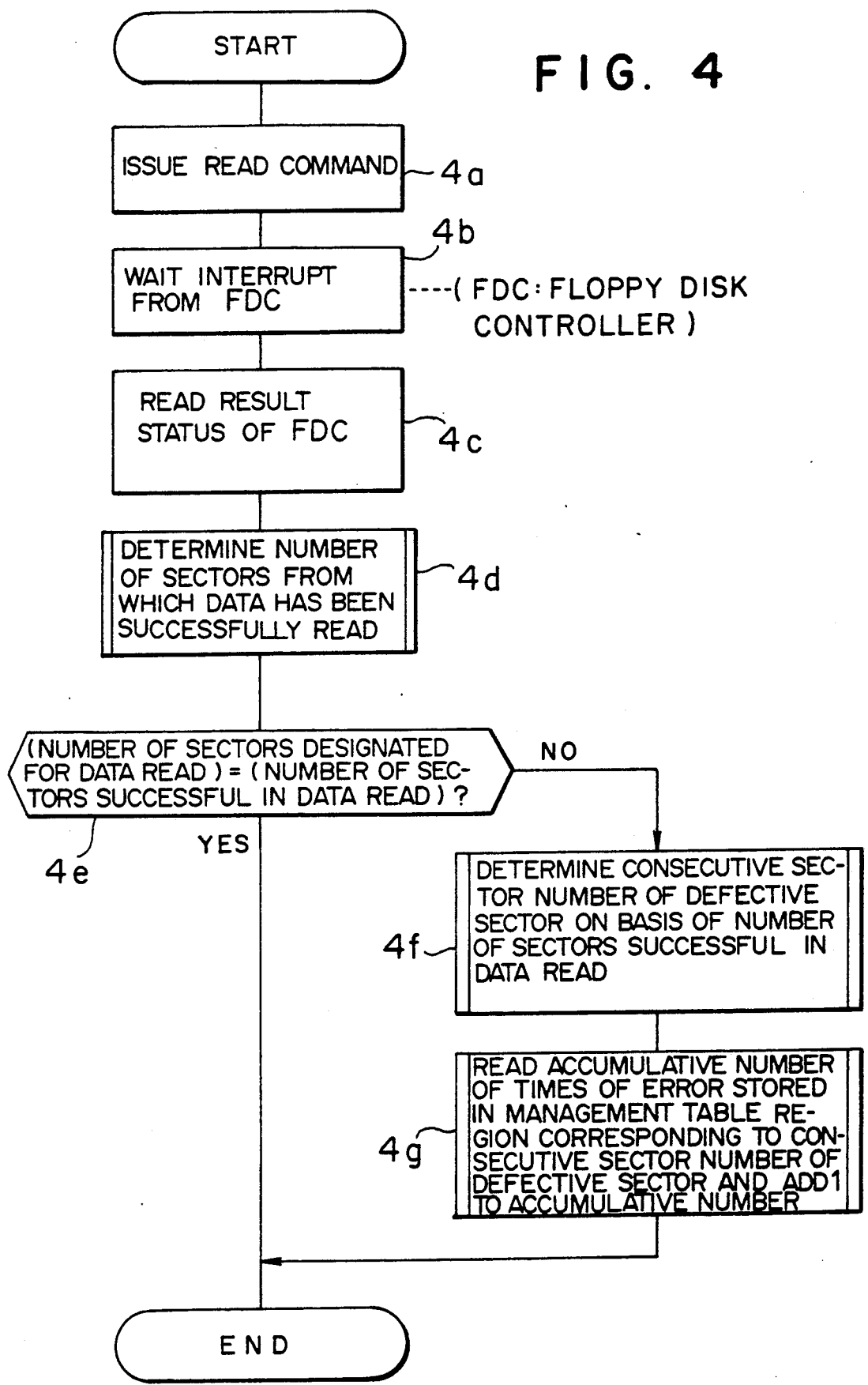
FIG. 4 shows a flow chart for explaining the operation of the embodiment.

Referring to FIG. 4, step 4a includes successively analyzing a read request from the application software 1i by the operating system 1h and the basic input/output system 1g so that a READ command including cylinder information, head information, and information concerning the position of a starting sector, the number of sectors to be subjected to a data read operation, and so on is issued to an FDC (Floppy Disk Controller) of the floppy disk device 1e through, the hardware 1a. Step 4b includes a process step of waiting for an interrupt by the FDC which takes place upon completion of the data read operation of the floppy disk 1e. Step 4c includes a process of reading the result status of the FDC after the completion of the data read operation. After the READ command has been issued at step 4a, data read from the floppy disk is delivered to the application software 1i through the hardware 1a, the basic input/output system 1g, the operating system 1h, etc. The number of sectors of the floppy disk 1e from which data have been normally or successfully read is determined in step 4d and is compared in step 4e with the number of sectors designated for data read upon issuance of the READ command at step 4a. When both the numbers of sectors coincide with each other, the data read from the floppy disk is judged as having been successfully completed and the routine is terminated. On the other hand, in the case where the comparison at step 4e shows anti-coincidence between the number of sectors designated for data read and the number of sectors successful in data read, the data read from the floppy disk is judged as having failed. Such a case is followed by step 4f in which a sector subsequent to the last sector successful in data read is specified as being a defective sector, and the consecutive sector number of the defective sector (one of a continuous series of numbers starting from 0) is determined on the basis of the position of the last sector successful in data read. In step 4g, the management table region 2e corresponding to the defective sector is determined from the consecutive sector number of the defective sector determined at step 4f; of accumulative number of times of error stored in the corresponding management table region 2e is read, and 1 (one) is added to the accumulative number of times. The resultant or new accumulative number of times is recorded into the corresponding management table region 2e again, thereby terminating the routine.

A procedure of determining the number of sectors in which data read has been successfully made at step 4d will be explained for reference by virtue of FIG. 5. In the following explanation are used symbols defined as follows.

cn: cylinder number upon issuance of READ command hn: head number upon issuance of READ command sn: sector number upon issuance of READ command rs: the number of sectors to be subjected to read operation upon issuance of READ command rs_cn: cylinder number after execution of read operation rs_sn: sector number after execution of read operation rs_hn: head number after execution of read operation In step 5a, head numbers hn and rs_hn before and after execution of a data read operation are compared with each other. In the case where there is a change in head number, the number of sectors successful in data read is determined in step 5c by virtue of the following expression:

$$8 - sn + rs\_sn. \quad (1)$$

On the other hand, in the case where the comparison at step 5a shows no change in head number, the number of sectors successful in data read is determined in step 5b by use of the following expression:

$$rs\_sn - sn. \quad (2)$$

Subsequently, cylinder number cn and rs_cn before and after execution of the data read operation are compared with each other in step 5d. When there is a change in cylinder number, the number of sectors in which data read has been made is calculated again in step 5e by use of the following expression:

$$(\text{the number of sectors subjected to the data read operation}) + 2 \times 8. \quad (3)$$

Simultaneously, a flag (not_erf) is set in step 5e. FIGS. 6A, 6B and 6C exemplarily illustrate sectors actually read of tracks 6a, 6b and 6c (shaded portions in the Figures) in the cases ①, ② and ③ of separate branching routes in the flow chart shown in FIG. 5, respectively. Briefly speaking, the case ① shown in FIG. 6A corresponds to the case where only a change in sector number exists, the case ② shown in FIG. 6B corresponds to the case where both a change in sector number and a change in head number exist, and the case ③ shown in FIG. 6C corresponds to the case where a change in cylinder number exists in addition to a change in sector number and a change in head number.

The above-mentioned processing for record of the accumulative number of times of error will now be explained in detail. The consecutive sector number of a defective sector resulting in a failure in data read is calculated from the following expression:

$$cn \times 2 \times 8 + hn \times 8 + (\text{the number of sectors successful in data read}) + 1. \quad (4)$$

The sector number is consecutively given starting from a heading or leading portion or sector of the usual data area 2a.

Figure 5:
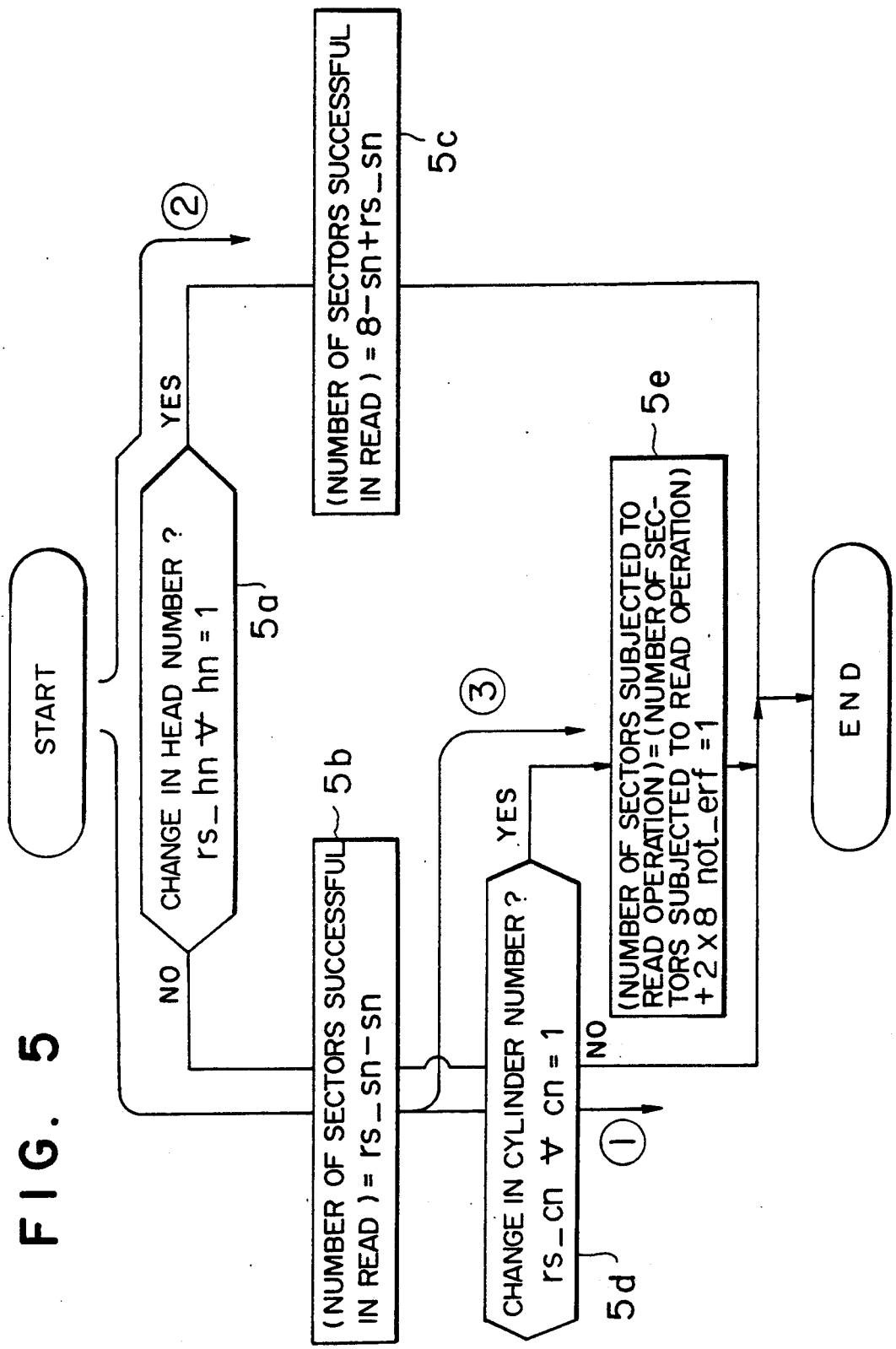
FIG. 5 is a view showing a procedure of determining the number of sectors successful in data read in the embodiment.
Figure 6A:
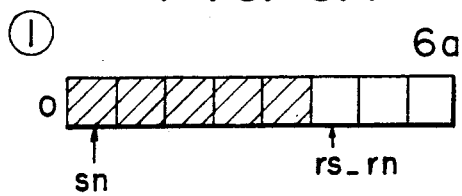
FIGS. 6A to 6C are views for exemplarily explaining sectors actually read in the cases of separate branching routes in the flow chart shown in FIG. 5, respectively.
Figure 6B:
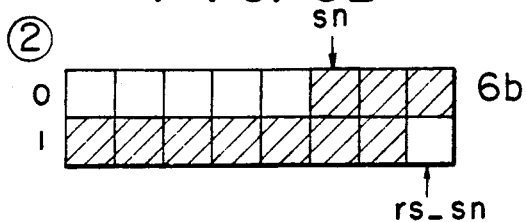
Figure 6C:
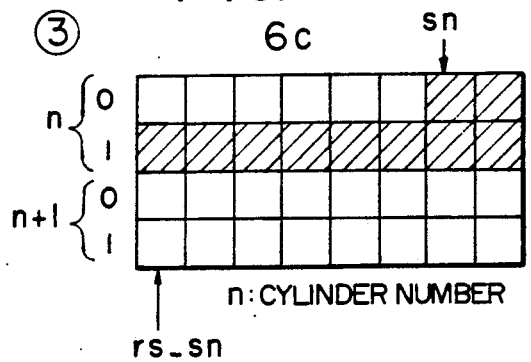
Figure 7:
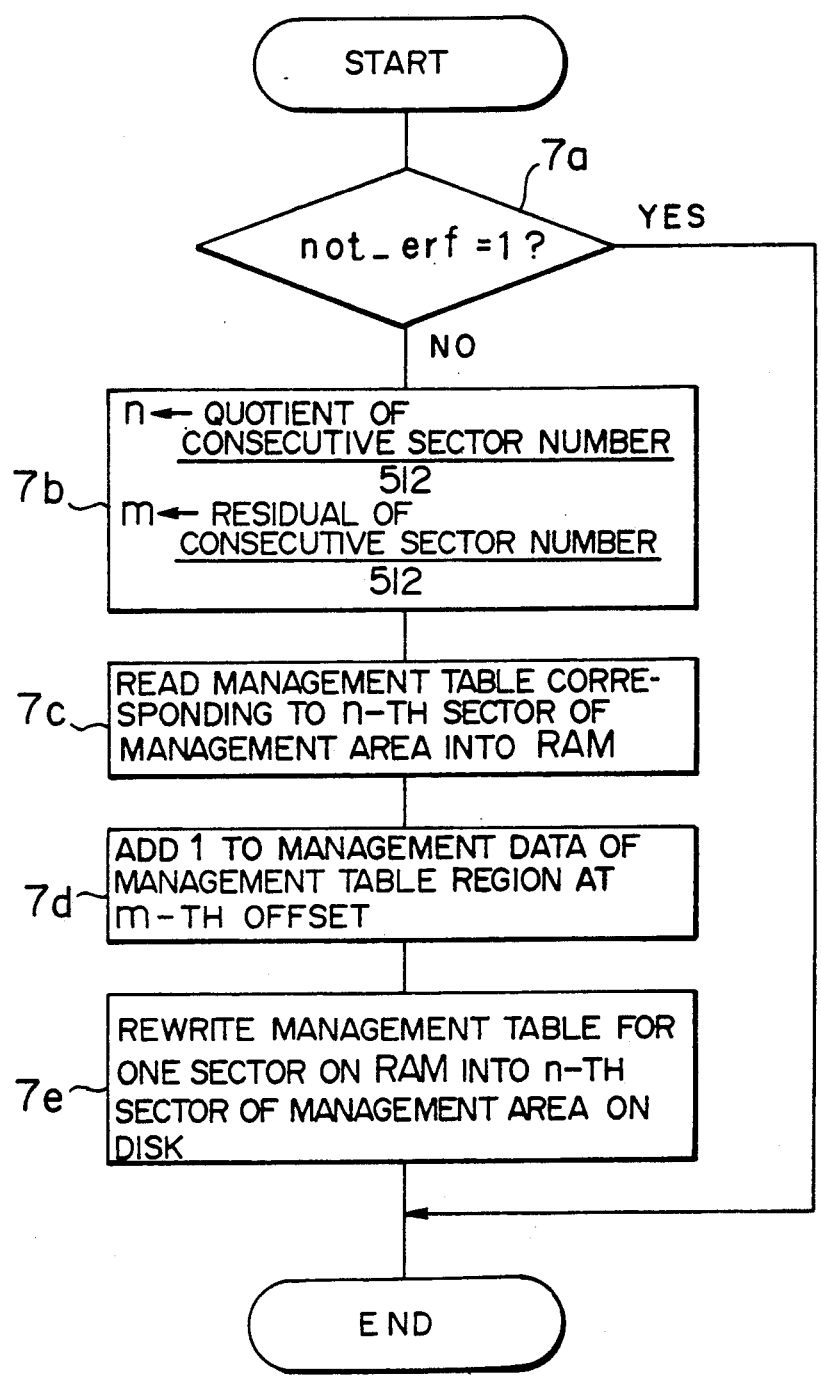
FIG. 7 shows a flow chart for explaining the operation of rewriting of management data in the embodiment.

Referring to FIG. 7, the flag (not_erf) which is to be set at step 5e of FIG. 5 is examined in step 7a for whether the flag is set or not. In the case where the flag is set, the routine is terminated. This is because accurate judgement of success or failure in data read is difficult in the system used in the present embodiment in the case where a change in cylinder number exists. In the case where step 7a determines that the flag (not_erf) is not set, the values of n and m represented by expressions $$n \leftarrow \text{quotient of} \frac{\text{consecutive sector number of defective sector}}{512} \quad (5)$$

and $$m \leftarrow \text{residual of} \frac{\text{consecutive sector number of defective sector}}{512} \quad (6)$$

are determined in step 7b on the basis of the consecutive sector number of the defective sector. In step 7c, the value of n determined by the expression (5) is used such that management table 2d corresponding to the n-th sector in the management data area 2b is read through the floppy disk device 1e in a similar manner to the case of usual data and is stored in into, for example, a work memory or RAM (not shown) preliminarily prepared in the basic input/output system 1g. In step 7c, management data (or the accumulative number of times of error having already occurred) of the management table region 2e at the m-th offset in the management data table 2d read or stored into the work memory is read on the basis of the value of m determined by the expression (6), 1 (one) is added to the read accumulative number of times, and the resultant or new accumulative number of times of error is again written into the corresponding management table region 2e in the work memory. In step 7e, the management data table 2d in the work memory which has been re-edited at step 7d is again written into the n-th sector of the management data area 2b in a similar manner to the case of usual data, thereby terminating the routine.

The foregoing embodiment has been explained in detail in conjunction with the case of reading of usual data from the floppy disk device 1e. Similarly, writing usual data to defective sectors may be checked to store the condition of occurrence of error into the management data area in the same manner as the case of reading.

The above-mentioned operation is repeated so that each time a read or write request is made from the application software 1i to the floppy disk device 1e, the condition of write or read (or the success in or failure of write or read) is confirmed checked to rewrite management data for allocated defective sector. Therefore, if the management data tables 2d of the management data area 2b are read periodically or continually to monitor the management data (or the accumulative numbers of times of error occurrence) in the management table regions 2e, various data can be prevented from being lost, by exchanging the floppy disk or performing a work for backup when the accumulative number of error occurrence reaches a certain value.

Figure 3:
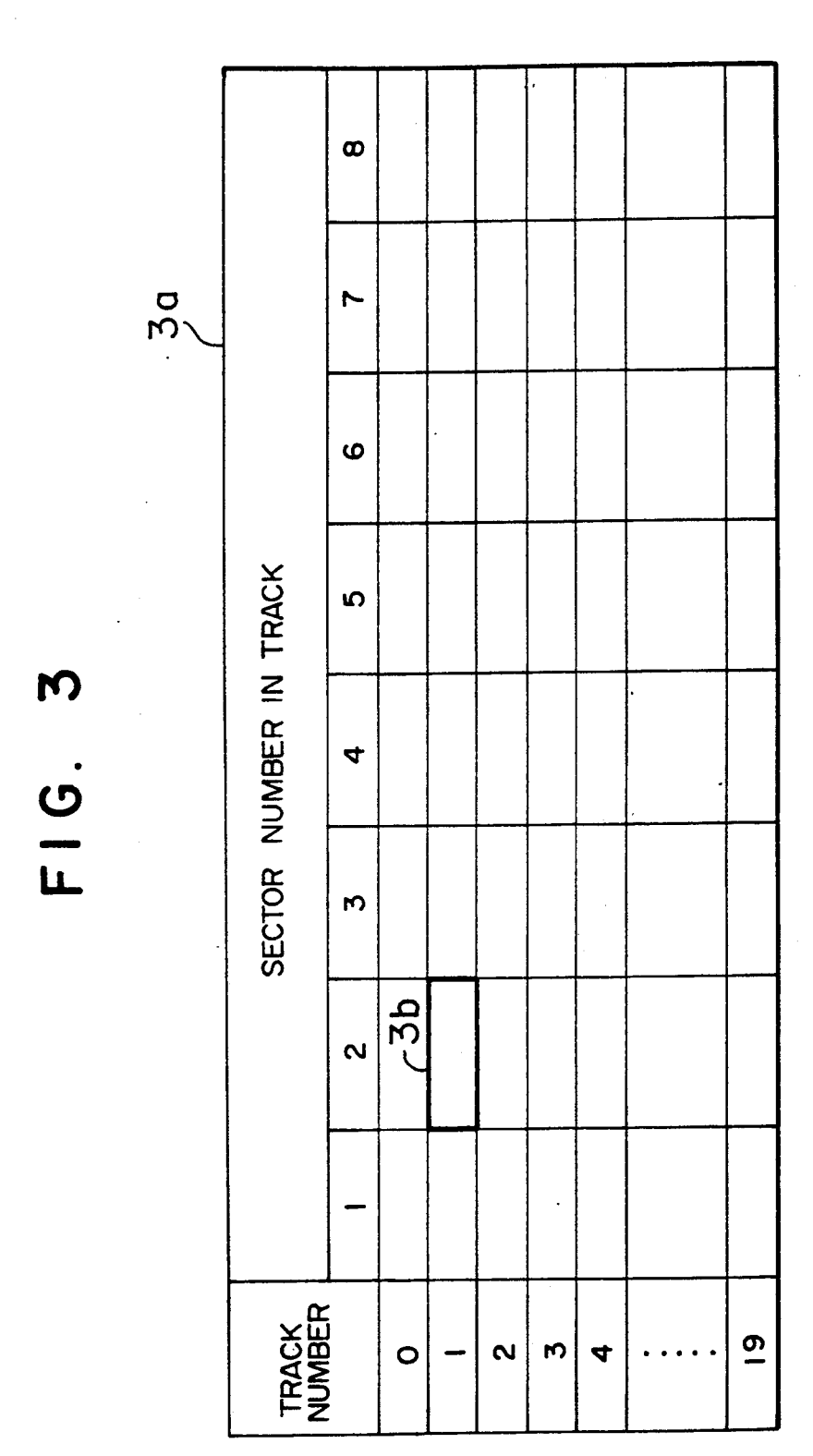

Next, an example of a method of reading the management data tables 2d and successively displaying the contents of the management table regions 2e on the display device 1d will be explained referring to FIG. 3. As shown in FIG. 3, in the table 3a displayed on the display device 1d the ordinate (or the leftmost headline) represents the track numbers (0-153) of tracks arranged on the floppy disk and the abscissa (or the uppermost head-line) represents the sector numbers (1-8) within each track. The number of times of error occurrence read from the management table regions 2e are displayed in the corresponding sector display columns in FIG. 3. A management data displaying means 1k for causing the number of times of error occurrence to be displayed is preliminarily prepared in the operating system 1h and may be activated before the operation of the application software 1i or in an interval between successive operations of the application software 1i. For example, each time an operation instruction from an operator is received, the management data displaying means 1k operates to cause the management data tables 2d to be read in a similar manner to the case of usual data and to cause the accumulative numbers of times of error occurrence to be displayed on the display device 1d in a table form shown in FIG. 3. Accordingly, it is possible for the operator to examine or check the displayed accumulative numbers of times of error occurrence and to exchange the floppy disk or perform a work for backup if the accumulative number of times of error occurrence shows a large value.

In the above-mentioned embodiment, the 0th to 154th tracks are provided in the floppy disk and sectors in a leading portion of the 154th track is used as the management data area. However, it is possible that the present invention can be embodied even if a track other than the 154th track is used as the management data area. The floppy disk in which the management data area is provided in the final track portion as in the present embodiment can be utilized by a computer system which does not include such a management system as is done in the present invention, for example, a computer system which manages only the 0th to 153rd tracks. Namely, the floppy disk according to the present embodiment can be compatibly or commonly used by a computer system which employs a management scheme according to the present invention and used by another computer system which does not employ such a management scheme.

The present embodiment has been explained in conjunction with the case where the floppy disk device 1e is used as an external memory. However, the present invention can be equally applied to the case where another device such as the hard disk device 1f is used as the external memory. Also, in the present embodiment, one management table region is prepared for each of the sectors in the usual data area for storage for usual data. Alternatively, one (or more) management table region may be prepared for a plurality of sectors.

The management data displaying means used in the embodiment only causes the contents of the management tables (or the accumulative numbers of times of error occurrence) to be displayed. But, the contents of the management tables can be displayed with different colors in accordance with the contents of the management tables or different display colors can be used for two or more predetermined ranges of the numbers of times of error occurrence, in order that a defective sector is easily recognized.

Also, in a known file system, a file in which a certain sector is included can be detected on the basis of the consecutive sector number of that sector by referring to directory regions or FAT's. Therefore, according to the present invention, it is possible to backup only a file inclusive of a defective sector (or a sector having a high possibility that it becomes defective) by another portion, thereby temporarily ensuring the reliability of data.

In the disclosed embodiment, in the case where an error in data write or data read occurs, the accumulative number of times of error occurrence is only stored and displayed. Alternatively, any warning message can be displayed when the accumulative number of times of error occurrence reaches a predetermined value.

In the disclosed embodiment, the number of times of error occurrence is stored as the management data in the management data area. Alternatively, the tolerable limit number of times for failure in data write or data read may be preliminarily stored as management data in the management data area so that the processing of subtraction for the limit number of times is performed each time a failure or error occurs, thereby permitting the management for maintenance of data.

As has been explained above, in the present invention, a storage medium has thereon, in addition to a usual data area for storage of usual data, a management data area for storage of management data concerning the failure in writing or reading of usual data in or from the usual data area and the management data in the management data area is rewritten upon failure of writing or reading of usual data. According to the present invention, therefore, it is possible to monitor a condition of the storage medium by reading the management data of the management data area, thereby performing the proper maintenance of data always.

I claim:

1. A data storage apparatus comprising:

a memory including a usual data area for the storage of usual data, said usual data area being divided into a plurality of usual data regions, each of said plurality of usual data regions having a predetermined capacity, said usual data being written into or read from said plurality of usual data regions and a management data area having a plurality of management data regions which correspond to said plurality of usual data regions, a management data region of said plurality of management at a regions corresponding to at least one usual data region of said plurality of usual data regions, said management data area for the storage of management data corresponding to said plurality of usual data regions;

usual data storage controlling means for controlling the writing or reading of said usual data in or from said plurality of usual data regions of the usual data area;

error detecting means for detecting the presence or absence of a failure of a data write or a data read by said usual data storage controlling means;

error region detecting means for responding to the detection of the failure of said data write or said data read by said error detecting means by specifying a defective usual data region of said usual data area corresponding to the failure of said data write or data read; and management data storage controlling means for rewriting the management data stored in said management data region of said management data area corresponding to the defective usual data region specified by said error region detecting means.

2. A data storage apparatus according to claim 1, wherein said memory includes a magnetic storage medium on which said usual data area and said management data area are located.

3. A data storage apparatus according to claim 1, wherein said usual data storage controlling means controls the writing or reading of said usual data in or from said memory in accordance with the linkage of said usual data regions, and said error region detecting means compares a first number of said plurality of usual data regions being successful in data write or data read with a second number of said plurality of usual data regions being subjected to data write or data read and specifies a defective usual data region of said plurality of usual data regions subsequent to the last usual data region of said plurality of usual data regions being successful in data write or data read when the first number does not coincide with the second number.

4. A data storage apparatus according to claim 3, wherein a previous number of times of the failure of data write or data read has been stored as said management data in said management data region of said management data are, and wherein said management data storage controlling means reads the management data stored in the management data region corresponding to the defective usual data region specified by said error region detecting means, adds a current number of times of failure to the previous number of times of failure read to generate a result and stores the result of addition into said management data region again.

5. A data storage apparatus according to claim 3, wherein a predetermined limit number of times for failure of data write or data read is initially stored as said management data said management data region of said management data area, and wherein said management data storage controlling means reads the management data stored in the management data region corresponding to the defective usual data region specified by said error region detecting means, subtracts a current number of times for failure from the management data which was read to generate a second result and stores the second result of subtraction into said management data region again.

6. A data storage apparatus comprising:

storage area setting means for storing usual data into a usual data area onto a sample medium, said usual data area being divided into a plurality of usual data regions, each of said plurality of usual data regions having a predetermined capacity and a management data read for the storage of management data, said management data area including a plurality of management data regions corresponding to said plurality of usual data regions, a management data region of said plurality of management data regions corresponding to at least one usual data region of said plurality of usual data regions;

usual data storage controlling means for controlling the writing or reading of said usual data into or from said plurality of usual data regions of said usual data area, in accordance with the linkage of said usual data regions;

error region detecting means for generating and comparing a first number of usual data regions being successful in data write or data read with a second number of usual data regions being subjected to data write or data read and specifying a defective usual data region of said plurality of usual data regions subsequent to a last usual data region of said plurality of usual data regions successful in data write or data read when the first number does not coincide with the second number;

management data storage controlling means for reading management data stored in a first management data region of said management data region corresponding to the defective usual data region specified by said error region detecting means to perform an operation on the management data which was read to generate a first result and writing the first result of said operation into said first management data region again; and management data displaying means for reading the management data stored in said first management data area and displaying management data which was read.

7. A data storage apparatus according to claim 6, wherein a previous number of times of failure in data write or data read has been stored as said management data in said management data region of said management data area, wherein said management data storage controlling means reads the management data stored in the first management data region corresponding to the defective usual data region specified by said error region detecting means, and wherein said operation is an addition of a current number of times of failure with the previous number of failures to generate a second result and stores the second result of addition as said management data into said first management data region again.

8. A data storage apparatus according to claim 6, wherein a predetermined limit number of times for failure of data write or data read is initially stored as said management data in each of said plurality of management data regions of said management data area, wherein said management data storage controlling means reads the management data stored in the first management data region corresponding to the defective usual data region specified by said error region detecting means, and wherein the operation is a subtraction of the current number of times for failure from the management data read to generate a third result and stores the third result of subtraction into said first management data region again.

9. A data storage apparatus comprising:
a memory including a usual data area divided into a plurality of usual data regions, each of said plurality of usual data regions having a predetermined capacity, said usual data area for the storage of usual data which is written into or read from said usual data area and a management data area having a plurality of management data regions which correspond to said plurality of usual data regions, a management data region of said plurality of management data regions corresponding to at least one usual data region of said plurality of usual data regions, said management data area for the storage of management data corresponding to said plurality of usual data regions;
usual data storage controlling means for controlling the writing or reading of said usual data in or from said usual data regions;
error detecting means for detecting the presence or absence of a failure of data write or data read by said usual data storage controlling means;
error region detecting means for responding to the detection of the failure of data write or data read by said error detecting means to specify a defective usual data region of said usual data area of said memory corresponding to the failure of data write or data read;
management data storage controlling means for rewriting the management data stored in a first management data region of said management data area corresponding to the defective usual data region specified by said error region detecting means; and
management data displaying means for reading the management data stored in said first management data area of said memory and displaying management data which was read.

10. A data storage apparatus according to claim 9, wherein said management data displaying means displays the management data in a display form which is changed in accordance with the contents of the management data.

11. A data storage apparatus according to claim 10, wherein said management data displaying means displays the management data with a display color in accordance with the contents of the management data.

12. A data storage apparatus comprising:
a memory including a usual data area for the storage of usual data, said usual data area being divided into a plurality of usual data regions, each of said plurality of usual data regions having a predetermined capacity, said usual data being written in or read from said plurality of usual data regions and a management data area having a plurality of management data regions which correspond to said plurality of usual data regions, a management data region of said plurality of management data regions corresponding to at least one usual data region of said plurality of usual data regions, said plurality of management data regions for the storage of management data corresponding to said plurality of usual data regions;
usual data storage controlling means for controlling the writing or reading of said usual data in or from said plurality of usual data regions;
error detecting means for detecting the presence or absence of a failure of data write or data read by said usual data storage controlling means;
error region detecting means for responding to the detection of the failure of data write or data read by said error detecting means to specify a defective usual data region of said usual data area of said memory corresponding to the failure of data write or data read; and
management data storage controlling means for rewriting the management data stored in a first management data region of said management data area corresponding to the defective usual data region specified by said error region detecting means; and
message displaying means for reading the management data stored in said first management data area of said memory and displaying a predetermined message when the management data is a predetermine value.

13. A data storage apparatus comprising:
a memory including a usual data area divided into a plurality of usual data regions, each of said plurality of usual data regions having a predetermined capacity, said usual data area for the storage of usual data which are written into or read from said plurality of usual data regions and a management data area for the storage of management data, said management data area having a plurality of management data regions which correspond to said plurality of usual data regions, a management data region of said plurality of management data regions corresponding to at least one usual data region of said plurality of usual data regions, said management data corresponding to said plurality of usual data regions;
usual data storage controlling means for controlling the writing or reading of said usual data in or from said plurality of usual data regions;
error region detecting means for detecting when the data write or data read by said usual data storage controlling means has resulted in a failure, and specifying a defective usual data region of said memory in which the data write or data read has failed; and
management data storage means for reading the management data stored in a first management data region corresponding to the defective usual data region specified by said error region detecting means to perform an operation on the read management data to generate a result and storing the result of said operation into said first management data region again.

* * * * *